United States Patent Office 3,083,365
Patented Mar. 26, 1963

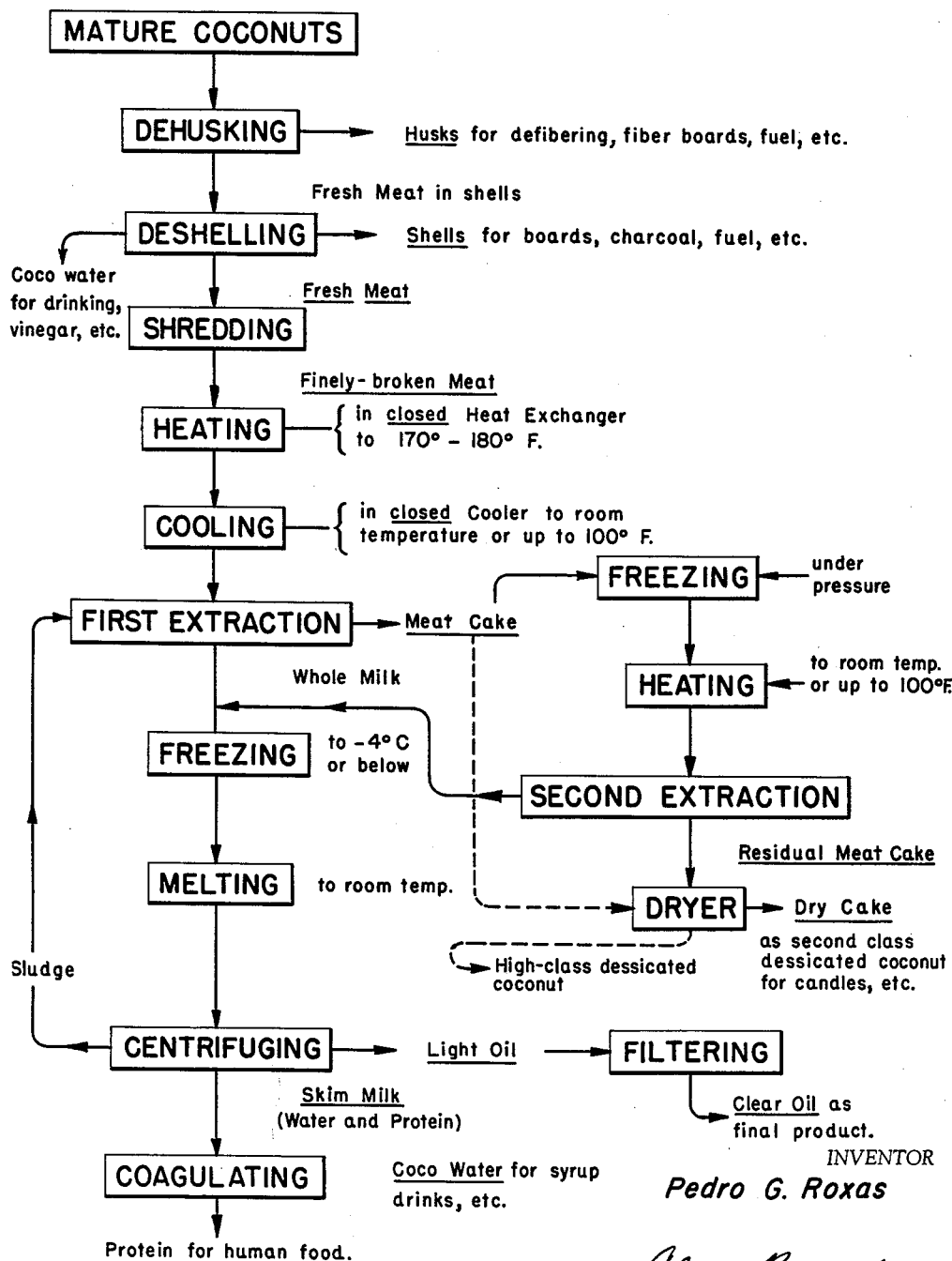

3,083,365
PROCESS OF RECOVERING OILS FROM OLEAGINOUS MEATS OF NUTS, BEANS, AND SEEDS
Pedro G. Roxas, Pasay City, Republic of the Philippines, assignor to Pablo Robledano, Manila, Republic of the Philippines
Filed June 8, 1960, Ser. No. 34,835
8 Claims. (Cl. 260—412.2)

This invention relates in general to processes of recovering oils from oleaginous meats of nuts, beans, seeds, and other like sources of vegetable oils, but more specifically to the mechanical extraction of clear non-rancid oil from fresh meats of mature coconuts.

It is common practice, in the mechanical extraction of oil from fresh coconut meat, to press the finely-broken fresh meat coming from the crusher, shredder, or grater without any thermal treatment that would prevent bacteria and fungi actions and insure higher oil recovery. In at least one method known, where the coconut meat is ground with the shell, boiling water is admixed with the ground mash in open containers exposed to the air, thereby resulting in oxidation and poor quality of oil. In all known processes of mechanical extraction, only the cream (after separating the water from the whole milk), is frozen instead of the whole milk, thereby, only a small quantity of ice is formed. Moreover, in the old known process, the residual meal cake coming from the press is either thrown away as waste, dried for animal feed, or in the attempt to recover some residual oil content, the pressed cake is macerated and re-pressed without some mechanical and thermal treatments which will justify a second pressing with high oil extraction.

The primary object of this invention is to provide for an improved process of recovering oils from oleaginous meats of nuts, beans, seeds and the like sources of vegetable oils directly from the fresh meats, without prior drying or other treatments but insuring a high recovery of high-quality oil and useful by-products.

Another object of this invention is to provide for intermediate processes between the usual grinding of the fresh meat and the pressing of the same, consisting of pasteurizing the finely-broken meat by heating in a closed heat exchanger and cooling same to room temperature before the first oil extraction therefrom; thereby, destroying the enzymes, avoiding oxidation, preventing bacterial and fungi actions, and coagulating the proteins on the meat, and not in the oil as in the prior arts, whereby decreasing its property to emulsify and resulting in an easier and higher oil recovery.

A further object of this invention is to provide an improved process of oil extraction which includes freezing, not the cream as in the prior arts but the whole milk from the first and second extractions, thereby, the high water content will produce more ice which insures the easier and more thorough rupturing of the oil cells leading to high oil recovery and de-emulsifying action even with less centrifuging.

Still another object of this invention is to provide for an effective and high oil recovery from the residual meal cake coming from the first press or extractor by freezing said meal cake under pressure, thereby the residual water expanding into ice, breaks the residual oil cells, and the second extraction that follows the melting, produces additional oil which otherwise is carried to waste in the dry cake.

Further objects, novel features of the process and equipment will appear from the following description when read in the light of the accompanying flow sheet, wherein are disclosed some preferred embodiments of the invention.

In the accompanying description and flow sheet, complete examples of the embodiment of my invention are illustrated, wherein various physical and thermal processes are combined and their corresponding equipment arranged in accord with some modes of the process devised for the practical application of the principles of the invention. It will, however, be understood that various changes and alterations are contemplated and may be made in the exemplifying flow sheet and description of the process within the scope of the invention without departing from the principles of the same.

For effective illustration, the following discussion, when read in the light of the accompanying flow sheet shows the application of the present process in the efficient high extraction of high-quality oil from the fresh meat of mature coconuts.

Mature coconuts, neither over-ripe nor under-ripe, the condition of the meat when the spot through which germination would eventually occur has just softened and the development of the haustorium has not yet commenced, are dehusked and deshelled in the usual mechanical manner. The husks are defibered, pressed into boards or used as fuel and other uses. The shells are powdered, pressed into boards, carbonized into charcoal or used as fuel and other uses. The coconut water is good for drinking, making vinegar and for other uses.

The fresh mature meat is shredded with the least rubbing to avoid artificial emulsification resulting from grinding action. The finely broken fresh meat is heated in closed heat exchanger to a temperature in the range of 170–180° F. at which the enzymes are destroyed and the bacterial and fungi actions are prevented. The pasteurized meat is then cooled to room temperature, also in closed heat exchanger for the first oil extraction, thus avoiding oxidation because there is no air contact and causing the coagulation of the protein on the meat.

This intermediate process of heating or pasteurizing the shredded fresh meat in a closed heater and cooling the same in a closed cooler to room temperature before the first oil extraction is new and a novelty of the present invention aimed to bring about the following desirable features not found heretofor in any old process of oil extraction and which results in a high-quality oil recovery.

(1) Since this heating is done in a closed heat exchanger, then the heated meat has no contact with the air and therefore there is no oxidation or contamination, thereby preserving the oil at high quality.

(2) Heating the fresh meat at a temperature within 170–180° F. will destroy the enzymes and therefore stops the decomposition of the material, thereby assuring a high-extraction of high-quality oil. Moreover, pasteurizing the fresh meat at this temperature range, will prevent bacterial and fungi actions, to preserve the high quality of the oil.

(3) Moreover, this heating will coagulate the protein on the meat, thereby decreasing its emulsification properties. In the old process, the protein is coagulated on the oil which makes its recovery difficult and the settling and separation of the impurities harder. In the present process, where the protein is coagulated on the meat, the settling is much faster and a higher oil recovery results from an easier oil extraction.

As shown in the accompanying flow sheet, after the first extraction, the whole milk, including the cream and the water, is frozen to about −4° C. (below ice formation), then melted to room temperature before centrifuging. This freezing of the whole milk instead of only the cream as is done in the old process, is another novel feature of the present invention which brings about the following desirable accomplishments resulting in a high oil recovery.

(1) The high water content of the whole milk (60–70%) will freeze into large amount of ice than that which results in freezing only the cream, thereby the expansion of the water accompanying its freezing into ice and the following contraction accompanying the melting of ice cubes back to liquid water, will insure the thorough rupturing of the oil cells which easily break even with only one centrifuging.

(2) The numerous ice crystals formed will destroy all the emulsifying properties of protein and make it more denatured, thus, an easier breaking of the oil cells is accomplished.

(3) The great amount of ice cubes formed together with the coagulation of the protein due to the previous heating, cause the membranes of the oil sacs to lose their elasticity, thereby said oil sacs are easier to break and hence give up more oil.

In an optional feature of the present process, the melted whole milk may be passed through the decanting tank and/or a gravity separation tank, before centrifuging.

From the centrifuge, the light oil is filtered (and may be deodorized) to produce the final clear oil product. As shown in the flow sheet, the sludge from the centrifuge may be conducted back to the first extractor to extract any remaining residual oil in it to insure a high over-all oil recovery. The skimmed milk, mainly water and protein, is coagulated, wherefrom the coagulated protein is recovered for human consumption while the coco water that separates therefrom is a good soft drink or can be used to make coco syrup, etc. The sludge from the centrifuge is conducted back to the extractor to further recover residual oil in it.

Referring back to the first oil extraction, as shown in the flow sheet, the meat cake is frozen under pressure, then cooled to room temperature before the second oil extraction. This is another novel feature of the present invention, whereby the residual water in said meal cake freezes and expands into ice and when it melts back and contracts to liquid water the remaining cell walls lose their elasticity and said residual oil cells break easily to produce some more oil in the second extraction that follows. This is facilitated by the pressure applied.

As shown in the flow sheet, the whole milk from the second extraction is combined with the whole milk from the first extraction. Finally, the residual meal cake from the second extraction is dried and the resulting dry cake, a second-class desiccated coconut, is used for human food in candies, chocolates, etc.

If desired, the meal cake from the first oil extraction may be directly dried, as shown by the dotted arrow in the flow sheet, without freezing, heating and the second oil extraction as described above, to form an oily high-class desiccated coconut for candies, etc.

It will be obvious to those skilled in the art that various changes may be made without departing from the spirit of the invention and therefore the invention is not limited to what is shown in the drawings and described in the specification, but only as indicated in the appended claims.

What is claimed is:

1. In the process of extracting and recovering oils from oleaginous meats of nuts, beans, and seeds, the steps of breaking up the meats into finely broken form, heating the finely broken fresh meat without contact with the air to a temperature in the range of 170°–180° F., cooling said meat to a temperature of at least 100° F. without contact with the air, extracting said meat to yield whole milk and a meat cake, freezing the whole milk, melting the whole milk, and separating said whole milk into the oil, skim milk and a sludge.

2. In the process of claim 1, wherein the sludge is returned and again subjected to the extracting step.

3. In the process of claim 1, wherein the meat cake resulting from the extraction step is frozen, heated to room temperature and again extracted to yield additional whole milk which is added to the whole milk from the first extraction step prior to the freezing thereof.

4. In the process of recovering oils from fresh coconut meat the steps of breaking up the coconut meat into finely broken form, heating the finely broken meat without contact with the air to a temperature in the range of 170°–180° F., cooling said meat to a temperature of at least 100° F., without contact with the air, extracting said meat to yield whole milk and a meat cake, freezing the whole milk, melting the whole milk, and centrifuging the whole milk to separate it into the oil, a skim milk and a sludge.

5. In the process of claim 4, wherein the sludge is returned and again subjected to the extracting step and the skim milk is coagulated to yield a protein for human food.

6. In the process of claim 4, wherein the meat cake is dried to yield a high class desiccated coconut.

7. In the process of claim 4, wherein the meat cake resulting from the extraction step is frozen, heated to room temperature and again extracted to yield additional whole milk which is added to the whole milk from the first extraction step prior to the freezing thereof.

8. In the process of claim 5, wherein the meat cake resulting from the extraction step is frozen, heated to room temperature and again extracted to yield additional whole milk which is added to the whole milk from the first extraction step prior to the freezing thereof.

References Cited in the file of this patent

UNITED STATES PATENTS

| | | |
|---|---|---|
| 1,454,705 | Croft | May 8, 1923 |
| 1,821,639 | Hiller | Sept. 1, 1931 |
| 2,191,455 | Davis et al. | Feb. 27, 1940 |
| 2,280,046 | Musher | Apr. 14, 1942 |
| 2,618,643 | Dunning | Nov. 18, 1952 |
| 2,671,098 | Pavia | Mar. 2, 1954 |
| 2,742,487 | Robledano | Apr. 17, 1956 |

FOREIGN PATENTS

| | | |
|---|---|---|
| 605,302 | Great Britain | July 20, 1948 |
| 728,502 | Great Britain | Apr. 20, 1955 |